US010017270B2

(12) United States Patent
Becker et al.

(10) Patent No.: US 10,017,270 B2
(45) Date of Patent: Jul. 10, 2018

(54) AFT ENGINE FOR AN AIRCRAFT

(71) Applicant: General Electric Company, Schenectady, NY (US)

(72) Inventors: Thomas Lee Becker, Symmes Township, OH (US); Kurt David Murrow, Liberty Township, OH (US); Patrick Michael Marrinan, Mason, OH (US); Brandon Wayne Miller, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 455 days.

(21) Appl. No.: 14/879,217

(22) Filed: Oct. 9, 2015

(65) Prior Publication Data

US 2017/0101191 A1     Apr. 13, 2017

(51) Int. Cl.

| B64D 33/02 | (2006.01) |
|---|---|
| B64D 27/18 | (2006.01) |
| B64D 27/24 | (2006.01) |
| B64D 27/26 | (2006.01) |
| F01D 15/10 | (2006.01) |
| F02C 7/32 | (2006.01) |

(Continued)

(52) U.S. Cl.
CPC ............... *B64D 33/02* (2013.01); *B64C 1/16* (2013.01); *B64C 21/06* (2013.01); *B64D 27/18* (2013.01);
(Continued)

(58) Field of Classification Search
CPC ... B64C 1/16; B64C 2230/20; B64C 2230/00; B64D 27/14; B64D 33/02;
(Continued)

(56) References Cited

U.S. PATENT DOCUMENTS

| 2,477,637 A | 8/1949 | Mercier |
|---|---|---|
| 2,812,912 A | 11/1957 | Stevens et al. |

(Continued)

FOREIGN PATENT DOCUMENTS

| CN | 104229137 A | 12/2014 |
|---|---|---|
| DE | 1756250 A1 * | 3/1970 |

(Continued)

OTHER PUBLICATIONS

European Search Report and Opinion issued in connection with Related EP Application No. 16188786.4 dated Nov. 16, 2016.

(Continued)

*Primary Examiner* — Peter M Poon
*Assistant Examiner* — Magdalena Topolski
(74) *Attorney, Agent, or Firm* — General Electric Company; Pamela A. Kachur

(57) ABSTRACT

A propulsion system for an aircraft is provided having an aft engine configured to be mounted to the aircraft at an aft end of the aircraft. The aft engine includes a fan rotatable about a central axis of the aft engine having a plurality of fan blades attached to a fan shaft. The aft engine also includes a nacelle encircling the plurality of fan blades and a structural support system for mounting the aft engine to the aircraft. The structural support system extends from the fuselage of the aircraft, through the fan shaft, and to the nacelle when the aft engine is mounted to the aircraft. The aft engine may increase a net thrust of the aircraft when mounted to the aircraft.

19 Claims, 6 Drawing Sheets

(51) Int. Cl.

| | | |
|---|---|---|
| *F02K 3/062* | (2006.01) | |
| *F04D 29/32* | (2006.01) | |
| *F04D 29/36* | (2006.01) | |
| *F04D 29/52* | (2006.01) | |
| *F04D 29/54* | (2006.01) | |
| *B64C 1/16* | (2006.01) | |
| *B64C 21/06* | (2006.01) | |
| *B64D 27/20* | (2006.01) | |
| *B64D 29/04* | (2006.01) | |
| *B64D 27/02* | (2006.01) | |

(52) U.S. Cl.
CPC ............ *B64D 27/20* (2013.01); *B64D 27/24* (2013.01); *B64D 27/26* (2013.01); *B64D 29/04* (2013.01); *F01D 15/10* (2013.01); *F02C 7/32* (2013.01); *F02K 3/062* (2013.01); *F04D 29/325* (2013.01); *F04D 29/36* (2013.01); *F04D 29/522* (2013.01); *F04D 29/542* (2013.01); *B64D 2027/026* (2013.01); *B64D 2033/0226* (2013.01); *F05D 2220/323* (2013.01); *Y02T 50/166* (2013.01)

(58) Field of Classification Search
CPC ........ B64D 2033/0226; B64D 2241/00; B64D 27/20; B64D 27/26; B64D 29/04
See application file for complete search history.

(56) References Cited

U.S. PATENT DOCUMENTS

| | | | |
|---|---|---|---|
| 2,918,229 A | 12/1959 | Lippisch | |
| 3,194,516 A | 7/1965 | Messerschmitt | |
| 3,286,470 A | 11/1966 | Gerlaugh | |
| 3,289,975 A | 12/1966 | Hall | |
| 3,312,448 A | 4/1967 | Hull, Jr. et al. | |
| 3,582,022 A * | 6/1971 | Robinson ................ | B64C 27/26 244/15 |
| 3,844,110 A | 10/1974 | Widlansky et al. | |
| 4,089,493 A | 5/1978 | Paulson | |
| 4,306,755 A * | 12/1981 | Roberts .................... | F01D 5/026 384/494 |
| 4,371,133 A * | 2/1983 | Edgley ................... | B64C 11/001 244/13 |
| 4,605,185 A | 8/1986 | Reyes | |
| 4,722,357 A | 2/1988 | Wynosky | |
| 4,913,380 A | 4/1990 | Verdaman et al. | |
| 5,721,402 A | 2/1998 | Parente | |
| 5,927,644 A | 7/1999 | Ellis et al. | |
| 6,089,505 A | 7/2000 | Gruensfelder et al. | |
| 6,976,655 B2 | 12/2005 | Thompson | |
| 7,387,189 B2 | 6/2008 | James et al. | |
| 7,493,754 B2 | 2/2009 | Moniz et al. | |
| 7,665,689 B2 | 2/2010 | McComb | |
| 7,806,363 B2 | 10/2010 | Udall et al. | |
| 7,819,358 B2 | 10/2010 | Belleville | |
| 7,905,449 B2 | 3/2011 | Cazals et al. | |
| 7,976,273 B2 | 7/2011 | Suciu et al. | |
| 8,033,094 B2 | 10/2011 | Suciu et al. | |
| 8,099,944 B2 | 1/2012 | Foster et al. | |
| 8,109,073 B2 | 2/2012 | Foster et al. | |
| 8,162,254 B2 | 4/2012 | Roche | |
| 8,181,900 B2 | 5/2012 | Chene et al. | |
| 8,220,739 B2 | 7/2012 | Cazals | |
| 8,226,040 B2 | 7/2012 | Neto | |
| 8,291,716 B2 | 10/2012 | Foster et al. | |
| 8,317,126 B2 | 11/2012 | Harris et al. | |
| 8,469,306 B2 | 6/2013 | Kuhn, Jr. | |
| 8,544,793 B1 | 10/2013 | Shammoh | |
| 8,549,833 B2 | 10/2013 | Hyde et al. | |
| 8,596,036 B2 | 12/2013 | Hyde et al. | |
| 8,640,439 B2 | 2/2014 | Hoffjann et al. | |
| 8,672,263 B2 | 3/2014 | Stolte | |
| 8,684,304 B2 | 4/2014 | Burns et al. | |
| 8,857,191 B2 | 10/2014 | Hyde et al. | |
| 8,890,343 B2 | 11/2014 | Bulin et al. | |
| 8,939,399 B2 | 1/2015 | Kouros et al. | |
| 8,998,580 B2 | 4/2015 | Quiroz-Hernandez | |
| 9,038,398 B2 | 5/2015 | Suciu et al. | |
| 2006/0011779 A1 | 1/2006 | Cazals et al. | |
| 2008/0023590 A1 | 1/2008 | Merrill et al. | |
| 2009/0127384 A1 | 5/2009 | Voorhees | |
| 2010/0038473 A1 | 2/2010 | Schneider et al. | |
| 2010/0294882 A1 | 11/2010 | Gantie et al. | |
| 2011/0215204 A1 | 9/2011 | Evulet | |
| 2012/0006935 A1 | 1/2012 | Bhargava | |
| 2012/0076635 A1 | 3/2012 | Atassi | |
| 2012/0119020 A1 | 5/2012 | Burns et al. | |
| 2012/0138736 A1 | 6/2012 | Cazals et al. | |
| 2012/0153076 A1 | 6/2012 | Burns et al. | |
| 2012/0209456 A1 | 8/2012 | Harmon et al. | |
| 2013/0032215 A1 | 2/2013 | Streifinger | |
| 2013/0036730 A1 | 2/2013 | Bruno et al. | |
| 2013/0052005 A1 | 2/2013 | Cloft | |
| 2013/0099065 A1 | 4/2013 | Stuhlberger | |
| 2013/0139515 A1 | 6/2013 | Schlak | |
| 2013/0184958 A1 | 7/2013 | Dyrla et al. | |
| 2013/0199624 A1 | 8/2013 | Smith et al. | |
| 2013/0227950 A1 | 9/2013 | Anderson et al. | |
| 2013/0251525 A1 | 9/2013 | Saiz | |
| 2013/0284279 A1 | 10/2013 | Richards | |
| 2013/0336781 A1 | 12/2013 | Rolt et al. | |
| 2014/0010652 A1 | 1/2014 | Suntharalingam et al. | |
| 2014/0060995 A1 | 3/2014 | Anderson et al. | |
| 2014/0151495 A1 | 6/2014 | Kuhn, Jr. | |
| 2014/0179535 A1 | 6/2014 | Stuckl et al. | |
| 2014/0212279 A1 | 7/2014 | Boudebiza et al. | |
| 2014/0250861 A1 | 9/2014 | Eames | |
| 2014/0283519 A1 | 9/2014 | Mariotto et al. | |
| 2014/0290208 A1 | 10/2014 | Rechain et al. | |
| 2014/0339371 A1 | 11/2014 | Yates et al. | |
| 2014/0345281 A1 | 11/2014 | Galbraith | |
| 2014/0346283 A1 | 11/2014 | Salyer | |
| 2014/0367510 A1 | 12/2014 | Viala et al. | |
| 2014/0367525 A1 | 12/2014 | Salyer | |
| 2014/0369810 A1 | 12/2014 | Binks et al. | |
| 2015/0013306 A1 | 1/2015 | Shelley | |
| 2015/0028594 A1 | 1/2015 | Mariotto | |
| 2015/0285144 A1 | 10/2015 | Todorovic et al. | |
| 2017/0137137 A1* | 5/2017 | Bordoni ................. | B64D 27/20 |

FOREIGN PATENT DOCUMENTS

| | | | |
|---|---|---|---|
| DE | 2016805 A1 * | 10/1970 | ............. B64D 27/20 |
| EP | 0887259 A2 | 12/1998 | |
| EP | 1616786 A1 | 1/2006 | |
| EP | 1 916 406 A2 | 4/2008 | |
| EP | 2730501 A2 | 5/2014 | |
| EP | 3048042 A1 | 7/2016 | |
| EP | 3093235 A1 | 11/2016 | |
| FR | 1181456 A | 6/1959 | |
| FR | 2993859 A1 | 1/2014 | |
| GB | 406713 A | 2/1934 | |
| GB | 974384 A * | 11/1964 | |
| GB | 1211081 A * | 11/1970 | ........... B64C 11/001 |
| GB | 2489311 A | 9/2012 | |
| JP | 2010-516546 A | 5/2010 | |
| WO | WO 2010/020199 A1 | 2/2010 | |
| WO | 2010103252 A1 | 9/2010 | |
| WO | WO 2014/072615 A1 | 5/2014 | |

OTHER PUBLICATIONS http://aviationweek.com/awin/boeing-researches-alternative-propulsion-and-fuel-options, Aviation Week & Space Technology, Jun. 4, 2012.

Bradley et al., "Subsonic Ultra Green Aircraft Research, Phase II: N+4 Advanced Concept Development," NASA/CR-2012-217556, May 2012.

U.S. Non-Final Office Action issued in Connection with Related U.S. Appl. No. 14/859,514 dated Apr. 6, 2017.

(56) References Cited

OTHER PUBLICATIONS

European Search Report and Opinion issued in connection with corresponding EP Application No. 16192467.5 dated Feb. 15, 2017.
"Concept Study Propulsive Fuselage: Adding an Extra Engine to Reduce Emissions", Bauhaus Luftfahrt, 02 Pages, May 20, 2014.
Notice of Allowance issued in connection with Related U.S. Appl. No. 14/859,549 dated Jan. 5, 2017.
U.S. Non-Final Office Action issued in connection with Related U.S. Appl. No. 14/859,566 dated Feb. 1, 2017.
Boeing 737, "https://en.wikipedia.org/wiki/Boeing_737", Retrieved on Feb. 4, 2017.
U.S. Non-Final Office Action issued in connection with Related U.S. Appl. No. 14/859,523 dated Feb. 9, 2017.
U.S. Non-Final Office Action issued in connection with Related U.S. Appl. No. 14/859,556 dated Feb. 9, 2017.
European Search Report and Opinion issued in connection with Related EP Application No. 16188826.8 dated Feb. 15, 2017.
European Search Report and Opinion issued in connection with Related EP Application No. 16188994.4 dated Feb. 17, 2017.
European Search Report and Opinion issued in connection with Related EP Application No. 16188464.8 dated Feb. 17, 2017.
Final Office Action issued in connection with Related U.S. Appl. No. 14/859,556 dated May 11, 2017.
Notice of Allowance issued in connection with Related U.S. Appl. No. 14/859,566 dated Jul. 14, 2017.
Canadian Office Action issued in connection with Related CA Application No. 2941822 dated Jul. 17, 2017.
Patrick Michael Marrinan et al., Sep. 21, 2015, U.S. Appl. No. 14/859,556.
Patrick Michael Marrinan et al., Sep. 21, 2015, U.S. Appl. No. 14/859,523.
Thomas Lee Becker et al., Sep. 21, 2015, U.S. Appl. No. 14/859,514.
Patrick Michael Marrinan et al., Sep. 21, 2015, U.S. Appl. No. 14/859,566.
Patrick Michael Marrinan et al., Sep. 21, 2015, U.S. Appl. No. 14/859,549.
Notification of Reasons for Refusal issued in connection with corresponding JP Application No. 2016-192434 dated Dec. 5, 2017.
Machine Translation and First Office Action and Search issued in connection with corresponding CN Application No. 201610879135.9 dated Jan. 2, 2018.

* cited by examiner

AFT ENGINE FOR AN AIRCRAFT

FIELD OF THE INVENTION

The present subject matter relates generally to an aircraft propulsion system including an aft engine.

BACKGROUND OF THE INVENTION

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage. Such a configuration allows for the turbofan jet engines to interact with separate, freestream airflows that are not impacted by the wings and/or fuselage. This configuration can reduce an amount of turbulence within the air entering an inlet of each respective turbofan jet engine, which has a positive effect on a net propulsive thrust of the aircraft.

However, a drag on the aircraft including the turbofan jet engines, also has an effect on the net propulsive thrust of the aircraft. A total amount of drag on the aircraft, including skin friction, form, and induced drag, is generally proportional to a difference between a freestream velocity of air approaching the aircraft and an average velocity of a wake downstream from the aircraft that is produced due to the drag on the aircraft.

Systems have been proposed to counter the effects of drag and/or to improve an efficiency of the turbofan jet engines. For example, certain propulsion systems incorporate boundary layer ingestion systems to route a portion of relatively slow moving air forming a boundary layer across, e.g., the fuselage and/or the wings, into the turbofan jet engines upstream from a fan section of the turbofan jet engines. Although this configuration can reduce drag by reenergizing the boundary layer airflow downstream from the aircraft, the relatively slow moving flow of air from the boundary layer entering the turbofan jet engine generally has a nonuniform or distorted velocity profile. As a result, such turbofan jet engines can experience an efficiency loss minimizing or negating any benefits of reduced drag on the aircraft.

Accordingly, a propulsion system including one or more components for reducing an amount of drag on the aircraft would be useful. More particularly, a propulsion system including one or more components for reducing an amount of drag on the aircraft without causing any substantial decreases in an efficiency of the aircraft engines would be especially beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a propulsion system for an aircraft having a fuselage is provided. The propulsion system includes an aft engine configured to be mounted to the aircraft at an aft end of the aircraft. The aft engine defines a central axis and includes a fan rotatable about the central axis of the aft engine. The fan includes a plurality of fan blades attached to a fan shaft. The aft engine also includes a nacelle encircling the plurality of fan blades of the fan and extending around the mean line of the aircraft at the aft end of the aircraft when the aft engine is mounted to the aircraft. The aft engine also includes a structural support system for mounting the aft engine to the aircraft. The structural support system extends from the fuselage of the aircraft, through the fan shaft, and to the nacelle when the aft engine is mounted to the aircraft.

In another exemplary embodiment of the present disclosure, a boundary layer ingestion fan for mounting to an aircraft at an aft end of the aircraft is provided. The boundary layer ingestion fan includes a fan rotatable about a central axis of the boundary layer ingestion fan. The fan including a plurality of fan blades attached to the fan shaft. The boundary layer ingestion fan also includes a nacelle encircling the plurality of fan blades of the fan and a structural support system for mounting the aft engine to the aircraft. The structural support system extends from the fuselage of the aircraft, through the fan shaft, and to the nacelle when the aft engine is mounted to the aircraft.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
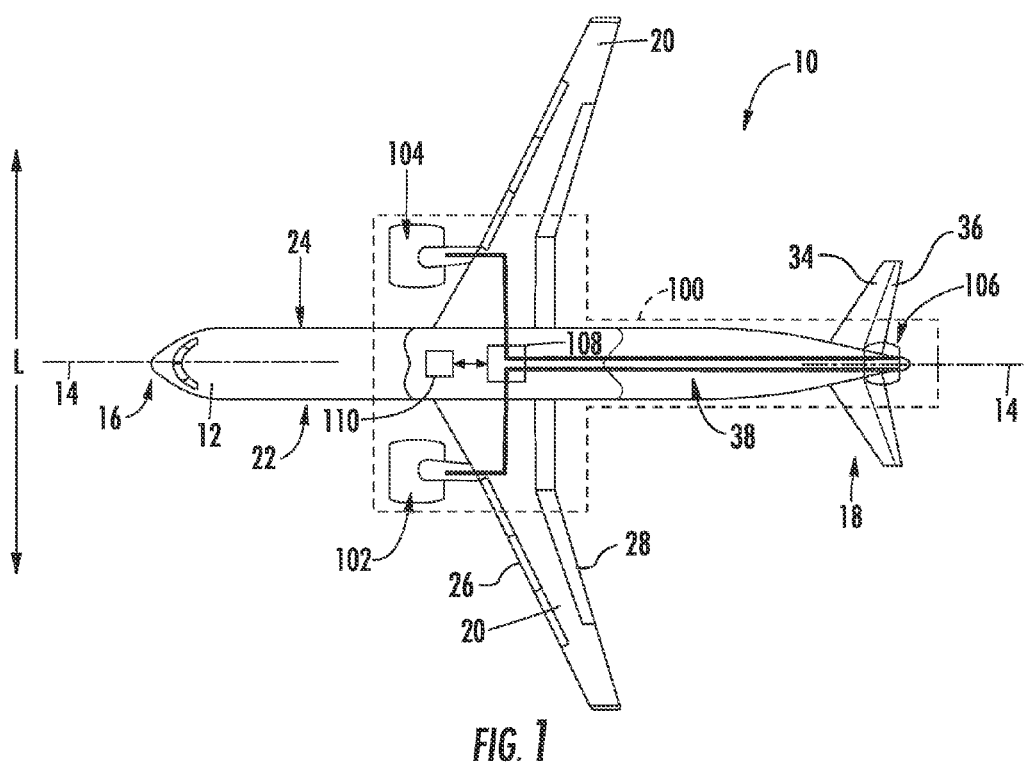
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 2:
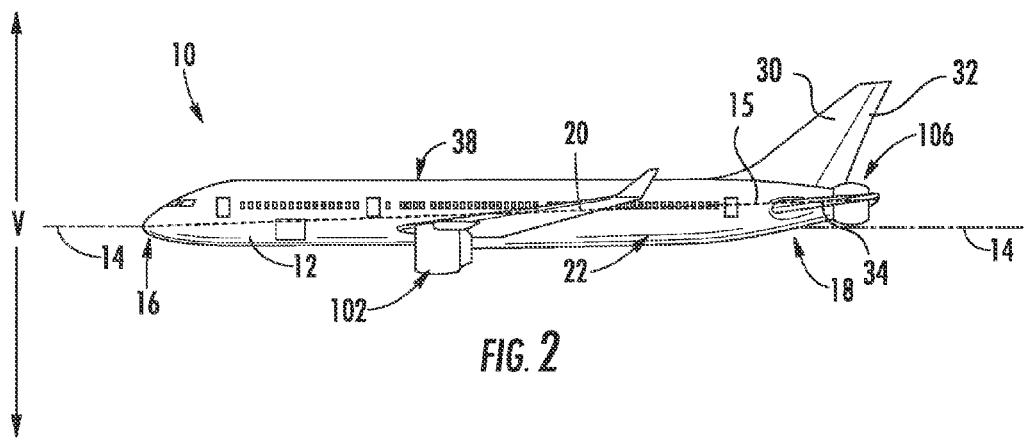
FIG. 2 is a port side view of the exemplary aircraft of FIG. 1

Referring now to the drawings, wherein identical numerals indicate the same elements throughout the figures, FIG. 1 provides a top view of an exemplary aircraft 10 as may incorporate various embodiments of the present invention. FIG. 2 provides a port side view of the aircraft 10 as illustrated in FIG. 1. As shown in FIGS. 1 and 2 collectively, the aircraft 10 defines a longitudinal centerline 14 that extends therethrough, a vertical direction V, a lateral direction L, a forward end 16, and an aft end 18. Moreover, the aircraft 10 defines a mean line 15 extending between the forward end 16 and aft end 18 of the aircraft 10. As used herein, the "mean line" refers to a midpoint line extending along a length of the aircraft 10, not taking into account the appendages of the aircraft 10 (such as the wings 20 and stabilizers discussed below).

Moreover, the aircraft 10 includes a fuselage 12, extending longitudinally from the forward end 16 of the aircraft 10 towards the aft end 18 of the aircraft 10, and a pair of wings 20. As used herein, the term "fuselage" generally includes all of the body of the aircraft 10, such as an empennage of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The aircraft 10 further includes a vertical stabilizer 30 having a rudder flap 32 for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction V or horizontal/lateral direction L.

The exemplary aircraft 10 of FIGS. 1 and 2 includes a propulsion system 100, herein referred to as "system 100". The exemplary system 100 includes a pair of aircraft engines, at least one of which mounted to each of the pair of wings 20, and an aft engine. For the embodiment depicted, the aircraft engines are configured as turbofan jet engines 102, 104 suspended beneath the wings 20 in an under-wing configuration. Additionally, the aft engine is configured as an engine configured to ingest and consume air forming a boundary layer over the fuselage 12 of the aircraft 10. Specifically, the aft engine is configured as a fan, i.e., a Boundary Layer Ingestion (BLI) fan 106, configured to ingest and consume air forming a boundary layer over the fuselage 12 of the aircraft 10. The BLI fan 106 is mounted to the aircraft 10 at a location aft of the wings 20 and/or the jet engines 102, 104, such that the mean line 15 extends therethrough. Specifically, for the embodiment depicted, the BLI fan 106 is fixedly connected to the fuselage 12 at the aft end 18, such that the BLI fan 106 is incorporated into or blended with a tail section at the aft end 18. However, it should be appreciated that in various other embodiments, some of which will be discussed below, the BLI fan 106 may alternatively be positioned at any suitable location of the aft end 18.

In various embodiments, the jet engines 102, 104 may be configured to provide power to an electric generator 108 and/or an energy storage device 110. For example, one or both of the jet engines 102, 104 may be configured to provide mechanical power from a rotating shaft (such as an LP shaft or HP shaft) to the electric generator 108. Additionally, the electric generator 108 may be configured to convert the mechanical power to electrical power and provide such electrical power to one or both of the energy storage device 110 or the BLI fan 106. Accordingly, in such an embodiment, the propulsion system 100 may be referred to as a gas-electric propulsion system. It should be appreciated, however, that the aircraft 10 and propulsion system 100 depicted in FIGS. 1 and 2 is provided by way of example only and that in other exemplary embodiments of the present disclosure, any other suitable aircraft 10 may be provided having a propulsion system 100 configured in any other suitable manner.

Figure 3:
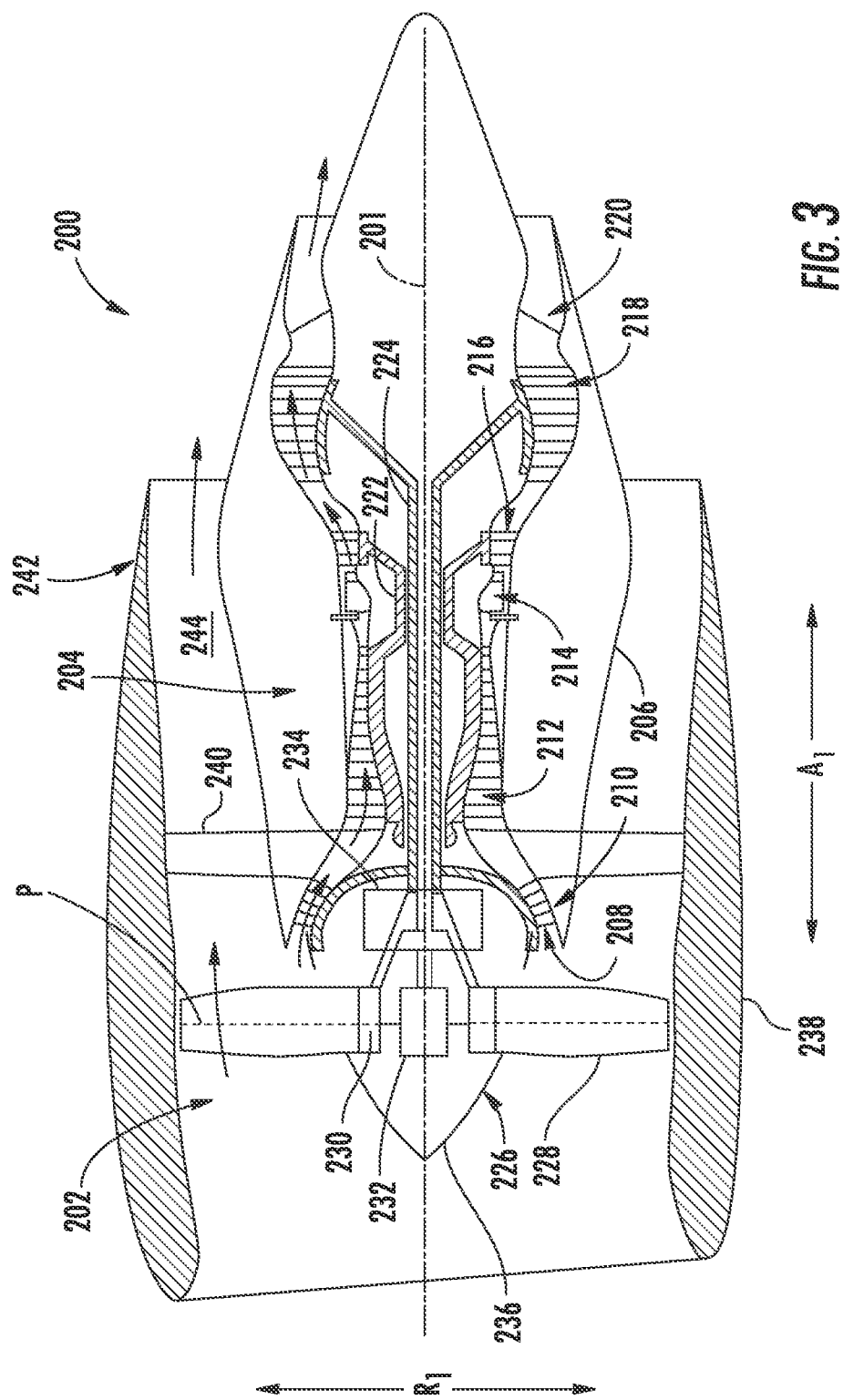
FIG. 3 is a schematic, cross-sectional view of a gas turbine engine mounted to the exemplary aircraft of FIG. 1.

Referring now to FIG. 3, in at least certain embodiments, the jet engines 102, 104 may be configured as high-bypass turbofan jet engines. FIG. 3 is a schematic cross-sectional view of an exemplary high-bypass turbofan jet engine 200, herein referred to as "turbofan 200." In various embodiments, the turbofan 200 may be representative of jet engines 102, 104. As shown in FIG. 3, the turbofan 200 defines an axial direction $A_1$ (extending parallel to a longitudinal centerline 201 provided for reference) and a radial direction $R_1$. In general, the turbofan 200 includes a fan section 202 and a core turbine engine 204 disposed downstream from the fan section 202.

The exemplary core turbine engine 204 depicted generally includes a substantially tubular outer casing 206 that defines an annular inlet 208. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. A high pressure (HP) shaft or spool 222 drivingly connects the HP turbine 216 to the HP compressor 212. A low pressure (LP) shaft or spool 224 drivingly connects the LP turbine 218 to the LP compressor 210.

For the embodiment depicted, the fan section 202 includes a variable pitch fan 226 having a plurality of fan blades 228 coupled to a disk 230 in a spaced apart manner. As depicted, the fan blades 228 extend outwardly from disk 230 generally along the radial direction $R_1$. Each fan blade 228 is rotatable relative to the disk 230 about a pitch axis P by virtue of the fan blades 228 being operatively coupled to a suitable actuation member 232 configured to collectively vary the pitch of the fan blades 228 in unison. The fan blades 228, disk 230, and actuation member 232 are together rotatable about the longitudinal axis 12 by LP shaft 224 across a power gear box 234. The power gear box 234 includes a plurality of gears for stepping down the rotational speed of the LP shaft 224 to a more efficient rotational fan speed.

Referring still to the exemplary embodiment of FIG. 3, the disk 230 is covered by rotatable front hub 236 aerodynamically contoured to promote an airflow through the plurality of fan blades 228. Additionally, the exemplary fan section 202 includes an annular fan casing or outer nacelle 238 that circumferentially surrounds the fan 226 and/or at least a portion of the core turbine engine 204. It should be appreciated that the nacelle 238 may be configured to be supported relative to the core turbine engine 204 by a plurality of circumferentially-spaced outlet guide vanes 240. Moreover, a downstream section 242 of the nacelle 238 may extend over an outer portion of the core turbine engine 204 so as to define a bypass airflow passage 244 therebetween.

It should be appreciated, however, that the exemplary turbofan engine 200 depicted in FIG. 3 is by way of example only, and that in other exemplary embodiments, the turbofan engine 200 may have any other suitable configuration. Further, it should be appreciated, that in other exemplary embodiments, the jet engines 102, 104 may instead be configured as any other suitable aeronautical engine.

Figure 4:
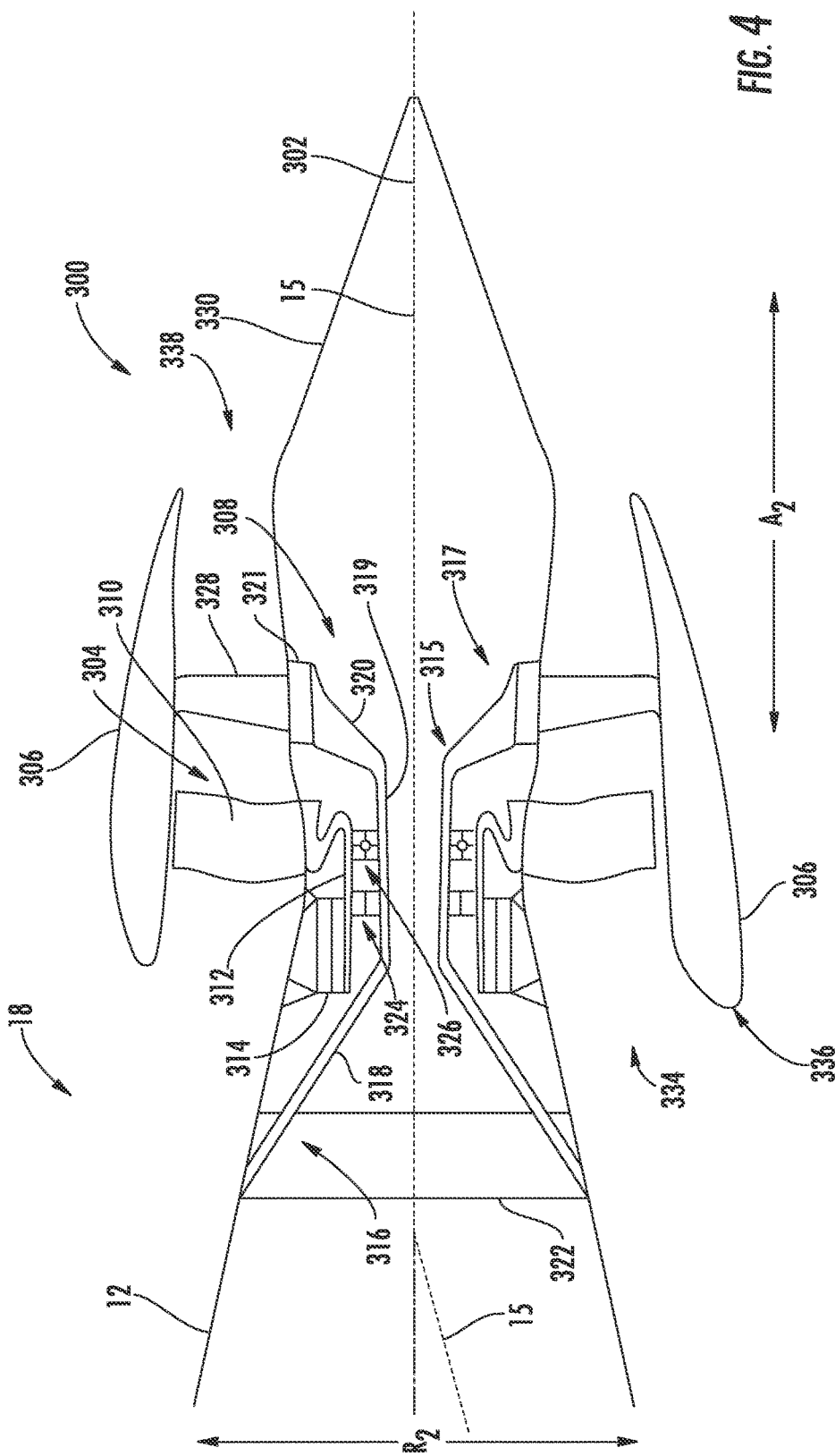
FIG. 4 is a schematic, cross-sectional view of an aft engine in accordance with an exemplary embodiment of the present disclosure.

Referring now to FIG. 4, a schematic, cross-sectional side view of an aft engine in accordance with various embodiments of the present disclosure is provided. The aft engine depicted is mounted to an aircraft 10 at an aft end 18 of the aircraft 10. Specifically, for the embodiment depicted, the aft engine is configured as a boundary layer ingestion (BLI) fan 300. The BLI fan 300 may be configured in substantially the same manner as the BLI fan 106 described above with reference to FIGS. 1 and 2 and the aircraft 10 may be configured in substantially the same manner as the exemplary aircraft 10 described above with reference to FIGS. 1 and 2. However, in other embodiments, the aft engine may instead be configured in any other suitable manner.

Figure 5:
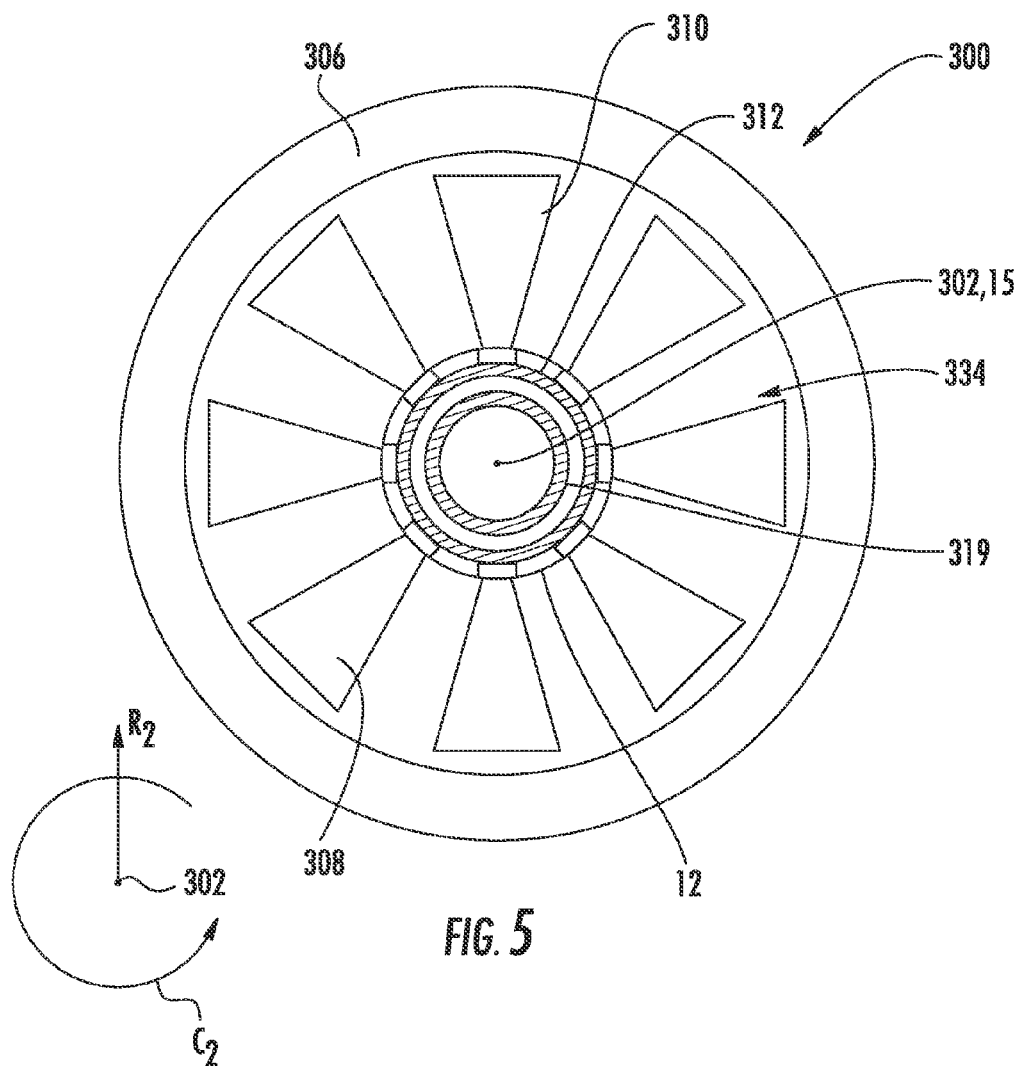
FIG. 5 is a schematic, cross-sectional view of the exemplary aft engine of FIG. 4, viewed along an axial centerline of the exemplary aft engine of FIG. 4.

As shown in FIG. 4, the BLI fan 300 defines an axial direction $A_2$ extending along a longitudinal centerline axis 302 that extends therethrough for reference, as well as a radial direction $R_2$ and a circumferential direction $C_2$ (see FIG. 5).

In general, the BLI fan 300 includes a fan 304 rotatable about the centerline axis 302, a nacelle 306 extending around a portion of the fan 304, and a structural support system 308. The fan 304 includes a plurality of fan blades 310 and a fan shaft 312. The plurality of fan blades 310 are attached to the fan shaft 312 and spaced generally along the circumferential direction $C_2$ of the turbofan engine 10 (FIG. 5).

In certain exemplary embodiments, the plurality of fan blades 310 may be attached in a fixed manner to the fan shaft 312, or alternatively, the plurality of fan blades 310 may be rotatably attached to the fan shaft 312. For example, the plurality of fan blades 310 may be attached to the fan shaft 312 such that a pitch of each of the plurality of fan blades 310 may be changed, e.g., in unison, by a pitch change mechanism (not shown). Changing the pitch of the plurality of fan blades 310 may increase an efficiency of the BLI fan 300 and/or may allow the BLI fan 300 to achieve a desired thrust profile. With such an exemplary embodiment, the BLI fan 300 may be referred to as a variable pitch BLI fan.

The fan shaft 312 is mechanically coupled to a power source 314 located at least partially within the fuselage 12 of the aircraft 10. In certain exemplary embodiments, the BLI fan 300 may be configured with a gas-electric propulsion system, such as the gas-electric propulsion system 100 described above with reference to FIG. 1. In such an embodiment, the power source 314 may be an electric motor that receives power from one or both of an energy storage device or an electric generator—such as the energy storage device 110 or electric generator 108 of FIGS. 1 and 2, the electric generator 108 converting mechanical power received from one or more under-wing mounted aircraft engines to electric power. Notably, the electric motor may be an inrunner electric motor, or alternatively may be an outrunner electric motor. In either embodiment, the electric motor may further include a gearbox mechanically coupling the electric motor to the fan shaft 312. Additionally, in still other exemplary embodiments, the power source 314 may instead be any other suitable power source. For example, the power source 314 may alternatively be configured as a gas engine, such as a gas turbine engine or internal combustion engine. Moreover, in certain exemplary embodiments, the power source 314 may be positioned at any other suitable location within, e.g., the fuselage 12 of the aircraft 10 or the BLI fan 300. For example, in certain exemplary embodiments, the power source 314 may be configured as a gas turbine engine positioned at least partially within the BLI fan 300.

As briefly stated above, the BLI fan 300 additionally includes a structural support system 308 for mounting the BLI fan 300 to the aircraft 10. The structural support system 308 extends generally from the fuselage 12 of the aircraft 10, through the fan shaft 312, and to the nacelle 306 of the BLI fan 300 when the BLI fan 300 is attached the aircraft 10. More specifically, the structural support system 308 generally includes a support shaft 315 extending between a first end 316 and a second end 317. Notably, as used herein, the term "support shaft" refers generally to any structural member, such as a support beam or rod. At the first end 316, the support shaft 315 is attached to the fuselage 12 of the aircraft 10 through a plurality of forward attachment arms 318 of the support shaft 315. For example, the plurality of forward attachment arms 318 of the support shaft 315 at the first end 316 of the support shaft 315 may be attached to a bulkhead 322 of the fuselage 12 of the aircraft 10.

The support shaft 315 extends from the first end 316, in the aft direction, through at least a portion of the fan shaft 312. For the embodiment depicted, the support shaft 315 includes a cylindrical body portion 319 extending through a center of the fan shaft 312—the cylindrical body portion 319 of the support shaft 315 being concentric with the fan shaft 312. Additionally the cylindrical body portion 319 of the support shaft 315 supports rotation of the fan shaft 312. More particularly, for the embodiment depicted, a bearing assembly is provided between the body portion 319 of the support shaft 315 and the fan shaft 312. The exemplary bearing assembly depicted generally includes roller bearings 324 positioned forward of ball bearings 326. It should be appreciated, however, that in other embodiments, any other suitable bearing assembly may be provided between the support shaft 315 and the fan shaft 312. Alternatively, the fan shaft 312 may be supported for rotation in any other suitable manner, using any other suitable bearing assembly.

Referring still to FIG. 4, the structural support system 308 further includes or more structural members 328 extending from the structural support shaft 315 to the nacelle 306. Specifically, for the embodiment depicted, the structural support shaft 315 includes a plurality of aft support arms 320 and a cylindrical support ring 321. The plurality of aft support arms 320 extend from the cylindrical body portion 319 of the support shaft 315 to the cylindrical support ring 321, and the one or more structural members 328 are attached to the cylindrical support ring 321. Additionally, for the embodiment depicted, the one or more structural members 328 include a plurality of circumferentially spaced structural members 328 attached to the second end 317 of the support shaft 315, i.e., to the cylindrical support ring 321. The one or more structural members 328 may provide structural support for the nacelle 306 and, e.g., a tail cone 330 of the BLI fan 300.

For the embodiment depicted in FIG. 4, the plurality of structural members 328 extend substantially along the radial direction $R_2$ to the nacelle 306, to provide structural support for the nacelle 306. Additionally, although not depicted, the structural member 328 may, in certain embodiments, be evenly spaced along the circumferential direction $C_2$ (FIG. 5). It should be appreciated, however, that the exemplary structural support system 308 depicted is provided by way of example only, and that in other exemplary embodiments, any other suitable structural support system 308 may be provided. For example, in other exemplary embodiments, the structural members 328 may instead define an angle relative to the radial direction $R_2$, and further may be unevenly spaced along the circumferential direction $C_2$. Additionally, the support shaft 315 may have any other suitable configuration. For example, in other exemplary embodiments, the support shaft 315 may be entirely formed of a cylindrical body portion, such that the cylindrical body portion mounts directly at a forward end to the fuselage 12 of the aircraft 10. Similarly, in other embodiments, the support shaft 315 may not include one or both of the aft attachment arms 320 or the cylindrical support ring 321. For example, in certain exemplary embodiments, the one or more structural members 328 may be attached directly to the cylindrical body portion 319 of the support shaft 315. Moreover, in still other embodiments, the support system 308 may include additional support features, e.g., static support features, positioned radially inward of the fan shaft 312 and, e.g., within the support shaft 315, or elsewhere for providing a desired amount of support for the structural member 328 and nacelle 306.

Notably, referring still to embodiment of FIG. 4, the one or more structural members 328 are attached to the nacelle 306, and extend from the support shaft 315 to the nacelle 306, at a location aft of the plurality of fan blades 310. The one or more structural members 328 may include a plurality of structural members 328 extending substantially along the radial direction $R_2$, as is depicted, and substantially evenly spaced along the circumferential direction $C_2$ (FIG. 5) of the BLI fan 300. For example, the one or more structural members 328 may include three or more structural members 328, five or more structural members 328, eight or more structural members 328, or twelve or more structural members 328. However, in other exemplary embodiments, the one or more structural members 328 may include any other suitable number of structural members 328, and may define any suitable angle with the longitudinal centerline 302. Additionally, in other exemplary embodiments, the one or more structural members 328 may be spaced in any suitable configuration along the circumferential direction $C_2$. It should be appreciated, that as used herein, terms of approximation, such as "approximately," "substantially," or "about," refer to being within a ten percent margin of error.

Moreover, in at least certain exemplary embodiments, the one or more structural members 328 may each be configured as an outlet guide vane. If configured as outlet guide vanes, the one or more structural members 328 may be configured for directing a flow of air through the BLI fan 300. Additionally, with such configuration, the one or more structural members 328 may be configured as fixed outlet guide vanes, or alternatively as variable outlet guide vanes. For example, each of the one or more structural members 328 may include a flap (not shown) positioned at an aft end rotatable about a substantially radial axis to vary a direction in which the structural member (configured as an outlet guide vane) directs the flow of air.

Aft of the plurality of fan blades 310 and aft of the one or more structural members 328 of the structural support system 308, the BLI fan 300 additionally defines a nozzle 338 between the nacelle 306 and the tail cone 330. The nozzle 338 may be configured to generate an amount of thrust from the air flowing therethrough, and the tail cone 330 may be shaped to minimize an amount of drag on the BLI fan 300. However, in other embodiments, the tail cone 330 may have any other shape and may, e.g., end forward of an aft end of the nacelle 306 such that the tail cone 330 is enclosed by the nacelle 306 at an aft end. Additionally, in other embodiments, the BLI fan 300 may not be configured to generate any measurable amount of thrust, and instead may be configured to ingest air from a boundary layer of air of the fuselage 12 of the aircraft 10 and add energy/speed up such air to reduce an overall drag on the aircraft 10 (and thus increase a net thrust of the aircraft 10).

Referring now also briefly to FIG. 5, a simplified, schematic, cross-sectional view of a forward end 336 of the BLI fan 300 is provided. As is depicted, the BLI fan 300 defines an inlet 334 at the forward end 336 of the BLI fan 300, between the nacelle 306 and the fuselage 12 of the aircraft 10. As mentioned above, the nacelle 306 of the BLI fan 300 extends around the mean line 15 of the aircraft 10 and the fuselage 12 of the aircraft 10 at the aft end 18 of the aircraft 10. Specifically, for the embodiment depicted, the inlet 334 of the BLI fan 300 extends substantially three hundred sixty degrees (360°) in the circumferential direction $C_2$ around the mean line 15 of the aircraft 10 and the fuselage 12 of the aircraft 10 when, such as in the embodiment depicted, the BLI fan 300 is mounted to the aircraft 10.

Figure 6:
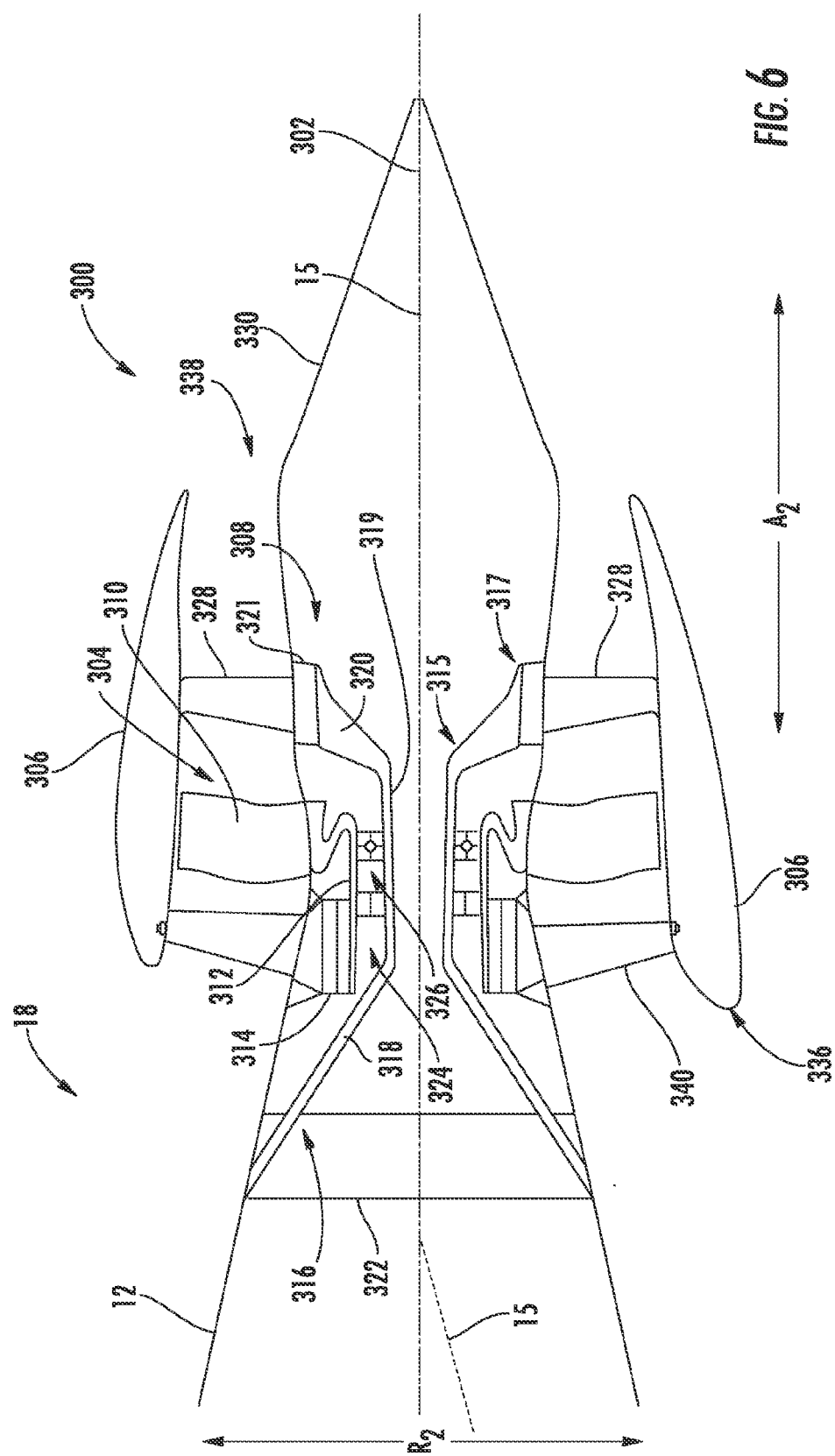
FIG. 6 is a schematic, cross-sectional view of an aft engine in accordance with another exemplary embodiment of the present disclosure.

Referring now to FIG. 6, a BLI fan 300 in accordance with another exemplary embodiment of the present disclosure is provided. The exemplary BLI fan 300 of FIG. 6 may be configured in substantially the same manner as the exemplary BLI fan 300 described above with reference to the FIG. 4. Accordingly, the same or similar numbering may refer to the same or similar components.

As is depicted, the exemplary BLI fan 300 of FIG. 6 generally includes a fan 304 rotatable about a centerline axis 302, a nacelle 306 extending around a portion of the fan 304, and a structural support system 308. The fan 304 generally includes a plurality of fan blades 310 and a fan shaft 312, with the plurality of fan blades 310 attached to the fan shaft 312. Additionally, the nacelle 306 extends around the plurality of fan blades 310 along the circumferential direction $C_2$, enclosing the plurality of fan blades 310.

The structural support system 308 may be configured in a similar manner to the exemplary structural support system 308 of FIG. 4. For example, the exemplary structural support system 308 may generally include a support shaft 315 attached at a first end 316 to a fuselage 12 of the aircraft 10 and one or more structural members 328 attached to a second end 317 of the support shaft 315. The one or more support members 328 extend from the second end 317 of the support shaft 315 to the nacelle 306 of the BLI fan 300, to support the BLI fan 300, and particularly the nacelle 306 of the BLI fan 300.

Additionally, for the embodiment depicted, the BLI fan 300 includes a plurality of forward support members 340. The forward support members 340 may be structural forward support members providing structural support and rigidity to the BLI fan 300, and particularly to the nacelle 306 of the BLI fan 300. Additionally, or alternatively, the forward support members 340 may be configured as inlet guide vanes. Specifically, the one or more forward support members 340 may be shaped and oriented to direct and condition a flow of air into the BLI fan 300 to, e.g., increase an efficiency of the BLI fan 300, or reduce a distortion of the air flowing into the BLI fan 300. In certain exemplary embodiments, the one or more forward support members 340 (configured as inlet guide vanes) may be configured as fixed inlet guide vanes, or alternatively, as variable inlet guide vanes. For example, the forward support members 340 may each include a flap (not shown) positioned at an aft end rotatable about a substantially radial axis to vary a direction in which the forward support members 340 (configured as an inlet guide vane) direct a flow of air.

Figure 7:
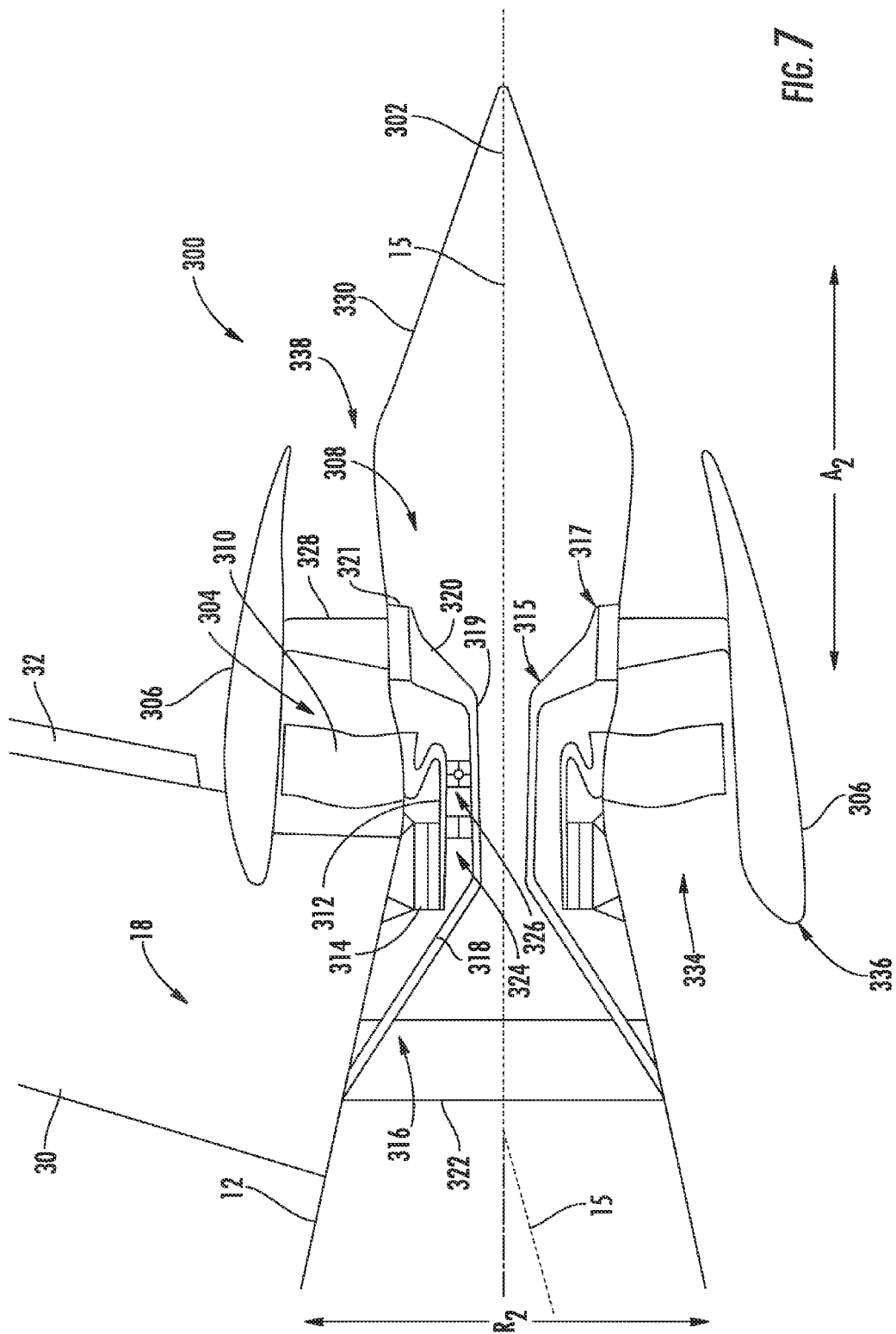
FIG. 7 is a schematic, cross-sectional view of an aft engine in accordance with yet another exemplary embodiment of the present disclosure.

Furthermore, referring now to FIG. 7, a schematic, cross-sectional view of a BLI fan 300 in accordance with yet another exemplary embodiment of the present disclosure is provided. The exemplary BLI fan 300 of FIG. 7 may also be configured in substantially the same manner as the exemplary BLI fan 300 of FIG. 4, and thus the same or similar numbering refers to the same or similar components.

However, for the embodiment of FIG. 7, the BLI fan 300 includes a vertical stabilizer 30 of the aircraft 10 incorporated into structural support system 308 of the BLI fan 300. Specifically, for the embodiment depicted, the vertical stabilizer 30 of the aircraft 10 extends between the fuselage 12 of the aircraft 10 and the nacelle 306 of the BLI fan 300, providing structural support for the BLI fan 300, or specifically to the nacelle 306 of the BLI fan 300. With such an exemplary embodiment, the vertical stabilizer 30 may be configured as a forward support member of the exemplary structural support system 308 of the BLI fan 300 of FIG. 7. Although not depicted, in other exemplary embodiments, a horizontal stabilizer (such as horizontal stabilizer 34 of FIGS. 1 and 2) and/or any other suitable stabilizer oriented in any other suitable direction may additionally or alternatively be configured as a forward support member for the BLI fan 300.

An aircraft including an aft fan according to an exemplary embodiment of the present disclosure may allow for the aft fan to generate thrust and/or to add energy to a boundary layer of air of the aircraft in an efficient manner. Specifically, an aircraft including an aft engine according to an exemplary embodiment of the present disclosure may allow for a flow of air to a fan of the BLI fan without requiring such flow of air to flow over or around one or more structural members located forward of a plurality of fan blades of the fan.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A propulsion system for an aircraft having a fuselage, the propulsion system comprising:
    an aft engine configured to be mounted to the aircraft at an aft end of the aircraft, the aft engine defining a central axis and comprising:
        a fan rotatable about the central axis of the aft engine and including a plurality of fan blades attached to a fan shaft;
        a nacelle encircling the plurality of fan blades of the fan and extending around a mean line of the aircraft at the aft end of the aircraft when the aft engine is mounted to the aircraft; and
        a structural support system for mounting the aft engine to the aircraft extending from the fuselage of the aircraft, through the fan shaft, and to the nacelle when the aft engine is mounted to the aircraft, the structural support system further comprising:
            a support shaft, the support shaft extending through the fan shaft and including a body portion; and
            a bearing assembly located radially outward of the support shaft body portion and radially inward of the fan shaft, the bearing assembly including at least one roller bearing and at least one ball bearing,
            wherein the at least one roller bearing is positioned axially forward of the at least one ball bearing.

2. The propulsion system of claim 1, wherein the aft engine is configured as a boundary layer ingestion fan.

3. The propulsion system of claim 2, wherein the support shaft is concentric with the fan shaft.

4. The propulsion system of claim 3, wherein the structural support system further includes one or more structural members extending from the structural support shaft to the nacelle.

5. The propulsion system of claim 4, wherein the one or more structural members are each configured as an outlet guide vane,
    wherein there are eight or more structural members, and
    wherein the eight or more structural members are circumferentially spaced evenly along the boundary layer ingestion fan.

6. The propulsion system of claim 1, wherein the structural support system includes one or more structural members attached to the nacelle at a location aft of the plurality of fan blades, and
    wherein the one or more structural members are evenly spaced circumferentially.

7. The propulsion system of claim 4, wherein the fan shaft is mechanically coupled to a power source located at least partially within the fuselage of the aircraft.

8. The propulsion system of claim 7, wherein the power source is an electric motor, and wherein the power source receives energy from an energy storage device.

9. The propulsion system of claim 7, wherein the power source is an outrunner electric motor.

10. The propulsion system of claim 7, wherein the propulsion system further includes two or more aircraft engines, wherein the two or more aircraft engines at least in part drive an electric generator, and wherein the power source is an electric motor in electrical communication with the electric generator.

11. The propulsion system of claim 10, wherein the fan is a variable pitch fan.

12. The propulsion system of claim 1, wherein the nacelle defines an inlet extending substantially 360 degrees around the mean line of the aircraft when the aft engine is mounted to the aircraft, the propulsion system further comprising:
    at least one forward support member, the at least one forward support member located axially forward of the plurality of fan blades and protruding across an inlet defined by the fan,
    wherein the at least one forward support member comprises at least one inlet guide vane.

13. The propulsion system of claim 1, wherein the aft engine is mounted to the aircraft, the aircraft having a pair of wings, wherein the propulsion system further includes two or more aircraft engines, each of which is mounted to one of the pair of wings of the aircraft, the propulsion system further comprising:
    an aircraft vertical stabilizer extending between the aircraft fuselage and the nacelle, the aircraft vertical stabilizer structurally coupled to both the aircraft fuselage and the nacelle,
    wherein the aircraft vertical stabilizer extends vertically beyond the nacelle.

14. The propulsion system of claim 1, wherein the structural support system is configured for mounting to a bulkhead of the fuselage of the aircraft when the aft engine is mounted to the aircraft, the propulsion system further comprising:
- at least one aircraft horizontal stabilizer extending between the aircraft fuselage and the nacelle,
- wherein the at least one aircraft horizontal stabilizer extends horizontally beyond the nacelle.

15. A boundary layer ingestion fan for mounting to an aircraft at an aft end of the aircraft, the boundary layer ingestion fan comprising:
- a fan rotatable about a central axis of the boundary layer ingestion fan and including a plurality of fan blades attached to a fan shaft;
- a nacelle encircling the plurality of fan blades of the fan; and
- a structural support system for mounting the boundary layer ingestion fan to the aircraft extending from a fuselage of the aircraft, through the fan shaft, and to the nacelle when the boundary layer ingestion fan is mounted to the aircraft, the structural support system further comprising:
  - a support shaft, the support shaft extending through the fan shaft and including a body portion; and
  - a bearing assembly located radially outward of the support shaft body portion and radially inward of the fan shaft, the bearing assembly including at least one roller bearing and at least one ball bearing,
- wherein the at least one roller bearing is positioned axially forward of the at least one ball bearing.

16. The boundary layer ingestion fan of claim 15, wherein the support shaft is concentric with the fan shaft.

17. The boundary layer ingestion fan of claim 15, wherein the structural support system further includes one or more structural members extending from the structural support shaft to the nacelle.

18. The boundary layer ingestion fan of claim 17, wherein the one or more structural members are each configured as an outlet guide vane.

19. A boundary layer ingestion fan for mounting to an aircraft at an aft end of the aircraft, the boundary layer ingestion fan comprising:
- a fan rotatable about a central axis of the boundary layer ingestion fan and including a plurality of fan blades attached to a fan shaft;
- a nacelle encircling the plurality of fan blades of the fan; and
- a structural support system for mounting the boundary layer ingestion fan to the aircraft extending from a fuselage of the aircraft, through the fan shaft, and to the nacelle when the boundary layer ingestion fan is mounted to the aircraft, the structural support system further comprising:
  - a support shaft, the support shaft including a cylindrical body portion;
  - a plurality of structural members, the plurality of structural members extending across a fan flow path and each member of the plurality of structural members structurally coupled to the nacelle;
  - a plurality of aft support arms; and
  - a cylindrical support ring, the cylindrical support ring located radially inward of the plurality of structural members,
- wherein each aft support arm of the plurality of aft support arms extends from the cylindrical body portion of the support shaft to the cylindrical support ring.

* * * * *